(12) United States Patent
Wagner

(10) Patent No.: US 9,223,855 B1
(45) Date of Patent: Dec. 29, 2015

(54) METHOD AND SYSTEM FOR TRAINING ATHLETES BASED ON ATHLETIC SIGNATURES AND A CLASSIFICATION THEREOF

(71) Applicant: Sparta Performance Science LLC, Menlo Park, CA (US)

(72) Inventor: Phillip Patrick Wagner, Menlo Park, CA (US)

(73) Assignee: SPARTA PERFORMANCE SCIENCE LLC, Menlo Park, CA (US)

( * ) Notice: Subject to any disclaimer, the term of this patent is extended or adjusted under 35 U.S.C. 154(b) by 210 days.

(21) Appl. No.: 14/033,295

(22) Filed: Sep. 20, 2013

(51) Int. Cl.
*G06F 7/00* (2006.01)
*G06F 17/30* (2006.01)

(52) U.S. Cl.
CPC ................ *G06F 17/30705* (2013.01)

(58) Field of Classification Search
CPC .............. A63B 24/0062; A63B 71/06; A63B 2220/803; A63B 24/0021; A63B 69/0028; A63B 2024/0065; A63B 24/0003; G06T 7/20
USPC .......................................................... 707/737
See application file for complete search history.

(56) References Cited

U.S. PATENT DOCUMENTS

| | | | | |
|---|---|---|---|---|
| 6,786,730 B2 * | 9/2004 | Bleckley et al. | ............. | 434/247 |
| 7,670,263 B2 * | 3/2010 | Ellis et al. | .......................... | 482/8 |
| 8,858,400 B2 * | 10/2014 | Johnson | ............................ | 482/9 |
| 2007/0225138 A1 * | 9/2007 | Mednick | ........................ | 482/148 |
| 2009/0030350 A1 * | 1/2009 | Yang et al. | ..................... | 600/595 |
| 2009/0210078 A1 * | 8/2009 | Crowley | ......................... | 700/91 |
| 2010/0173732 A1 * | 7/2010 | Vaniche et al. | ............... | 473/422 |
| 2012/0029666 A1 * | 2/2012 | Crowley et al. | ................. | 700/91 |
| 2012/0212505 A1 * | 8/2012 | Burroughs et al. | ........... | 345/629 |
| 2013/0252216 A1 * | 9/2013 | Clavin et al. | ................... | 434/257 |
| 2014/0074179 A1 * | 3/2014 | Heldman et al. | ................ | 607/45 |
| 2014/0074265 A1 * | 3/2014 | Arginsky et al. | ............... | 700/91 |
| 2014/0180173 A1 * | 6/2014 | Sullivan et al. | ............... | 600/595 |
| 2014/0287391 A1 * | 9/2014 | Krull | ............................. | 434/247 |
| 2014/0336796 A1 * | 11/2014 | Agnew | ............................ | 700/91 |
| 2015/0154403 A1 * | 6/2015 | Dornbush et al. | ............. | 434/247 |

OTHER PUBLICATIONS

Medical Services Futbol Club Barcelona, "Clinical Practice Guide for Muscular injuries. Epidemiology, diagnosis, treatment and prevention", Feb. 9, 2009.*
Randolph Hospital, "Coaches' Guide to Sports Injuries", Dec. 18, 2010.*

* cited by examiner

*Primary Examiner* — Binh V Ho
(74) *Attorney, Agent, or Firm* — HM Law Group LLP; Vani Moodley, Esq.

(57) ABSTRACT

A method for training athletes is disclosed. The method comprises: maintaining a classification for signatures generated based on movement data associated with athletes; wherein the movement data is stored in a database; associating guidance with each signature in the classification; and assigning a signature from the database to at least some athletes in the database.

18 Claims, 14 Drawing Sheets

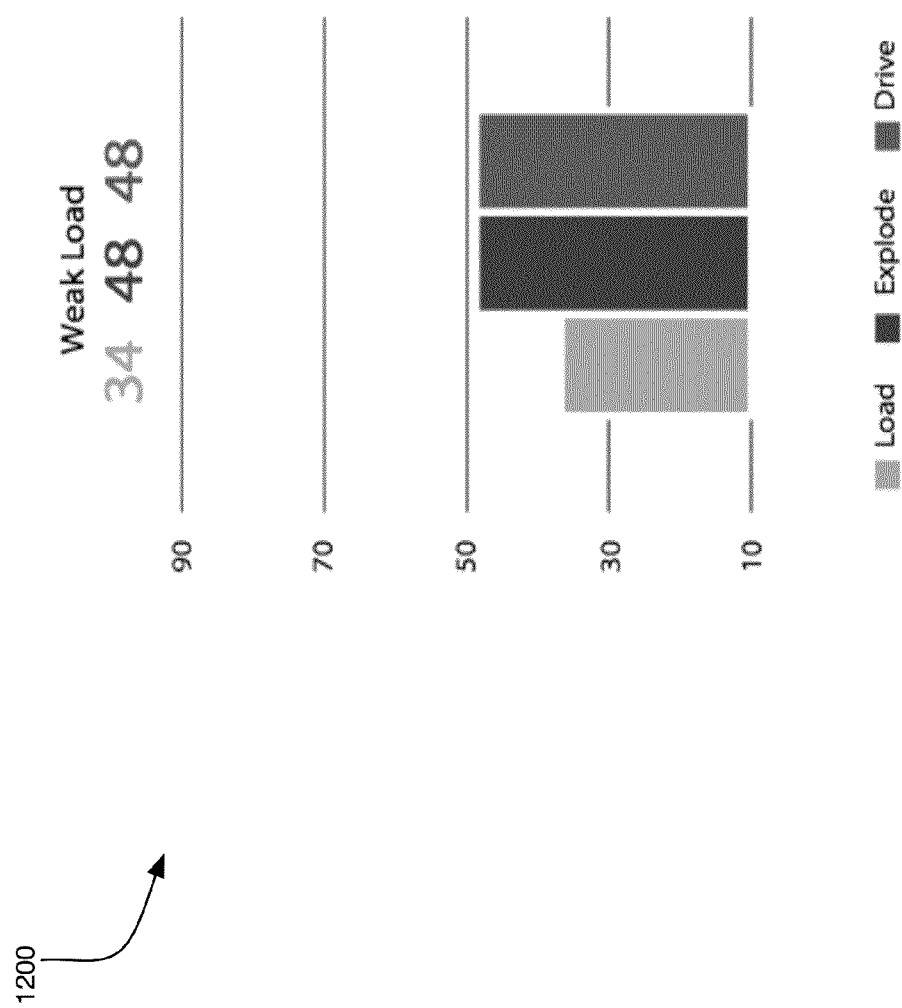

| | A | B | C | D | E | F | G |
|---|---|---|---|---|---|---|---|
| 1 | | | | | | | |
| 2 | | | | | | | |
| 3 | class | label | diagnosed via | genetics/ethnic/trai background | sport/position correlation | injury risk | exercise needs |
| 4 | Athletic Movement Signatures | rotational | explode<5 from others | caucasian, higher body fat | pitcher, quarterback | limited | core stability |
| 5 | | linear | load<5 from others | ectomorph, lanky | wide receiver, rugby fullback/wing, outfielder | limited | squat, quick jumps |
| 6 | | lateral | drive<5 from others | mesomorph, african american, polynesian | running back, soccer, any defensive specialist | limited | center of pressure awarenss of arch rather than forefoot |
| 7 | Extreme Movement Signatures | extrme load | load>10 from others | massive body mass, endomorph upper body and core stability | offensive linemna, fron row rugby, baseball catcher | twisting injuries-acl and foot | longer movements to prolong and absorb forces |
| 8 | | extreme explode | explode>10 from others | excessive emphasis | basketball, tight ends | back injuries | full range of molton, lower body emphasis |
| 9 | | extreme drive | drive>10 from others | females, asian | volleyball | twisting back injuries (vertebrae, ligament) | eccentric strength, upper body and squats (heavy!) |
| 10 | Weak Movement Signatures | weak load | load<10 from others | over trained, limited use of ankles | baseball | lower hamstring and upper body | squats |
| 11 | | weak explode | explode<10 from others | no heavy or intense, quick training/sport | baseball pitchers | lumbopelvix hip (sports hernia) | limited range of motion with higher loads |
| 12 | | weak drive | drive<10 from others | all heavy, no prolonged movements | football, university athletes | muscle strains | glute/hamstring strength |

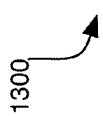

FIG. 13

METHOD AND SYSTEM FOR TRAINING ATHLETES BASED ON ATHLETIC SIGNATURES AND A CLASSIFICATION THEREOF

FIELD

Embodiments of the present invention relate to athletic performance. In particular, embodiments of the present invention relate to systems for analyzing athletic movement

BACKGROUND

A force plate may be used to generate data relating to athletic movement, e.g. in the form of a jump. However, the data can be quite voluminous as a data point may be generated once every millisecond. This makes analysis of the data difficult.

SUMMARY

According to a first aspect of the invention, a method for training athletes is disclosed. The method comprises: maintaining a classification for signatures generated based on movement data associated with athletes; wherein the movement data is stored in a database; associating guidance with each signature in the classification; and assigning a signature from the database to at least some athletes in the database.

Other aspects of the invention will be apparent from the detailed description below.

BRIEF DESCRIPTION OF THE FIGURES

FIG. 4-12 show examples of signatures, in accordance with one embodiment of the invention;

FIG. 13 shows an example of guidance, in accordance with one embodiment of the invention.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
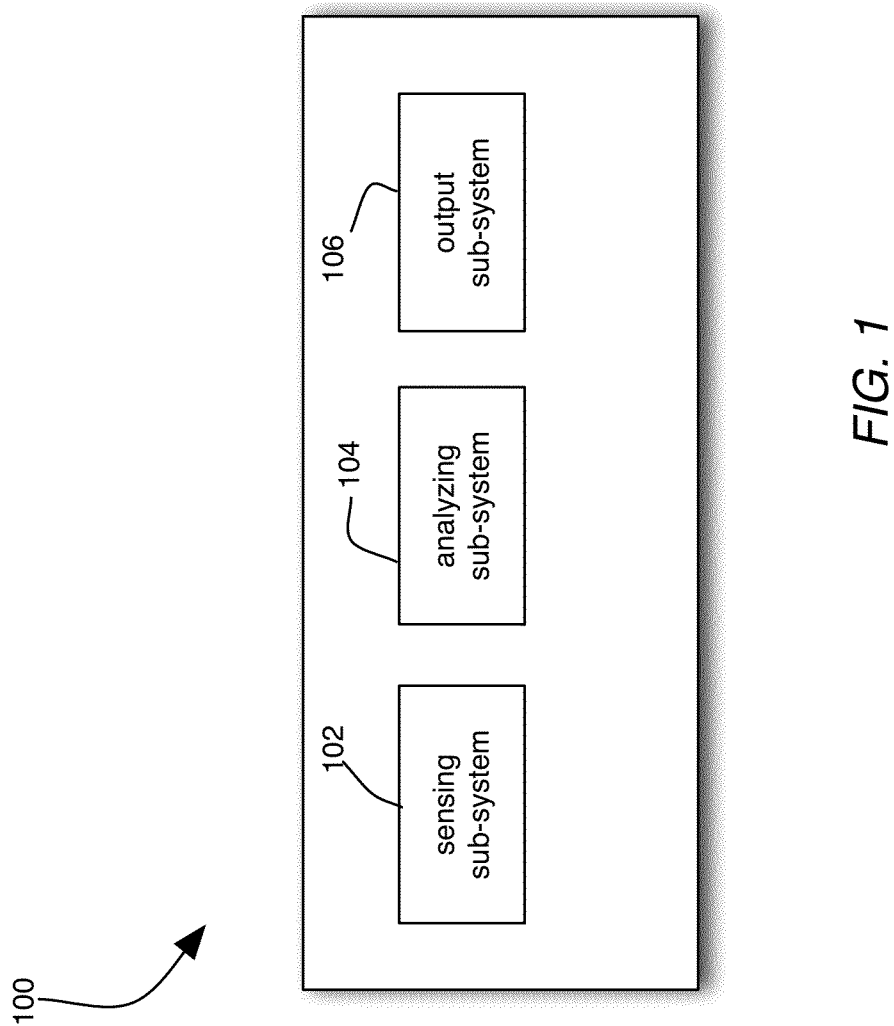
FIG. 1 shows a logical block diagram of a system to analyze athletic movement, in accordance with one embodiment of the invention.

Referring to FIG. 1, embodiments of the present invention disclose a system 100 for analyzing athletic movement. For illustrative purposes consider the athletic movement to be a vertical jump. However, it is to be understood that at the system maybe used to analyze other forms of athletic movement, such as golf and baseball swings, baseball and football throws, sprinting, agility, basketball shooting, and kicking.

The system 100 may, at least logically, be divided into a sensing sub-system 102, an analytical sub-system 104, and an output sub-system 106.

Figure 2:
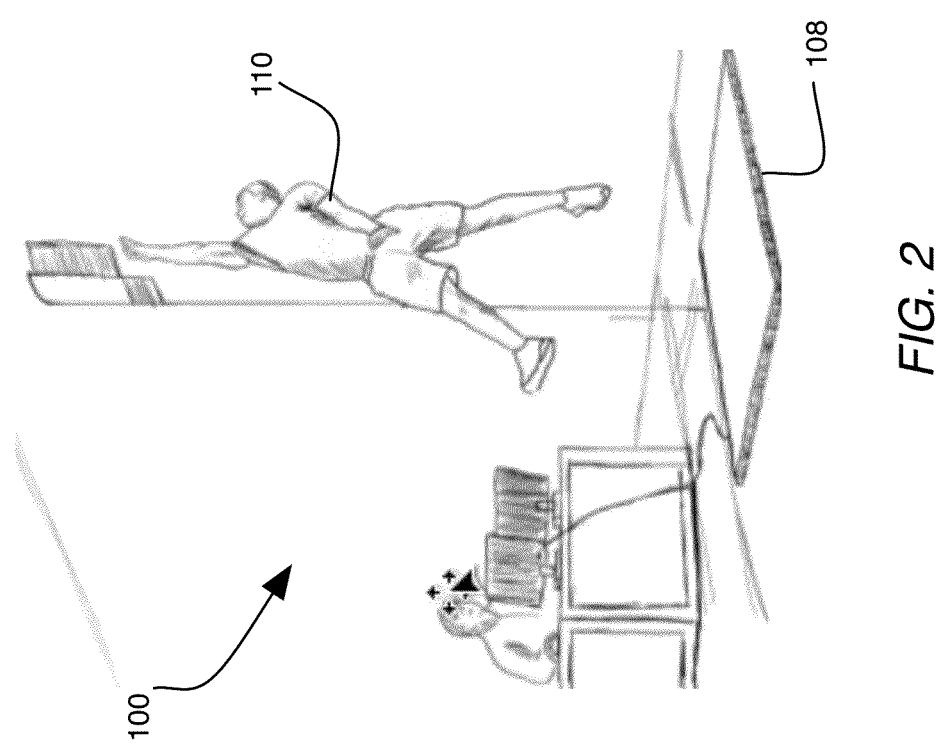
FIG. 2 shows the system of FIG. 1 implemented with a force-plate, in accordance with one embodiment of the invention.

The sensing sub-system 102 may include sensors for sensing a time-dependent variable that changes during the athletic movement. In one embodiment, the sensing sub-system 102 may include a sensor in the form of a force-plate 108, as shown in FIG. 2. In other embodiments, the sensing sub-system 102 may include other types of sensors. For example, in one embodiment, the sensing sub-system 102 may include an accelerometer, which may be integrated, for example, into a bracelet or a shoe pod. In use, an athlete 110 initiates a vertical jump (athletic movement) on the force-plate 108. The force plate records changes in force over time (typically one force reading in captured each millisecond). An analog-to-digital converter (not shown) converts the analog force signal into a digital signal for analysis by the analytical sub-system 104.

The analytical sub-system 104 may include instructions to process the digital signal in order to compile an athletic signature for the athlete 110. In one embodiment, the analytical sub-system 104 extracts selected portions of a force-time curve output by the sensing sub-system 102. Said selected portions may comprise phases of the jump including a load phase, an explode phase, and a drive phase, as detailed below:

(a) load phase: comprises data relating to the average eccentric rate of force development during the jump.

(b) explode phase: comprises data relating to the average relative concentric peak force generated during the jump, computed as average concentric peak force divide by the athlete's weight.

(c) drive phase: comprises data relating to the concentric relative impulse for the jump.

Typically, the system 100 is configured to process a plurality of jumps for each athlete and to store data for each athlete in the form of an athletic signature Each athletic signature may by used to profile an athlete in terms of at least suitability for a given sport, proneness to injury, suitability for particular athletic gear (e.g. shoes), etc.

Figure 3:
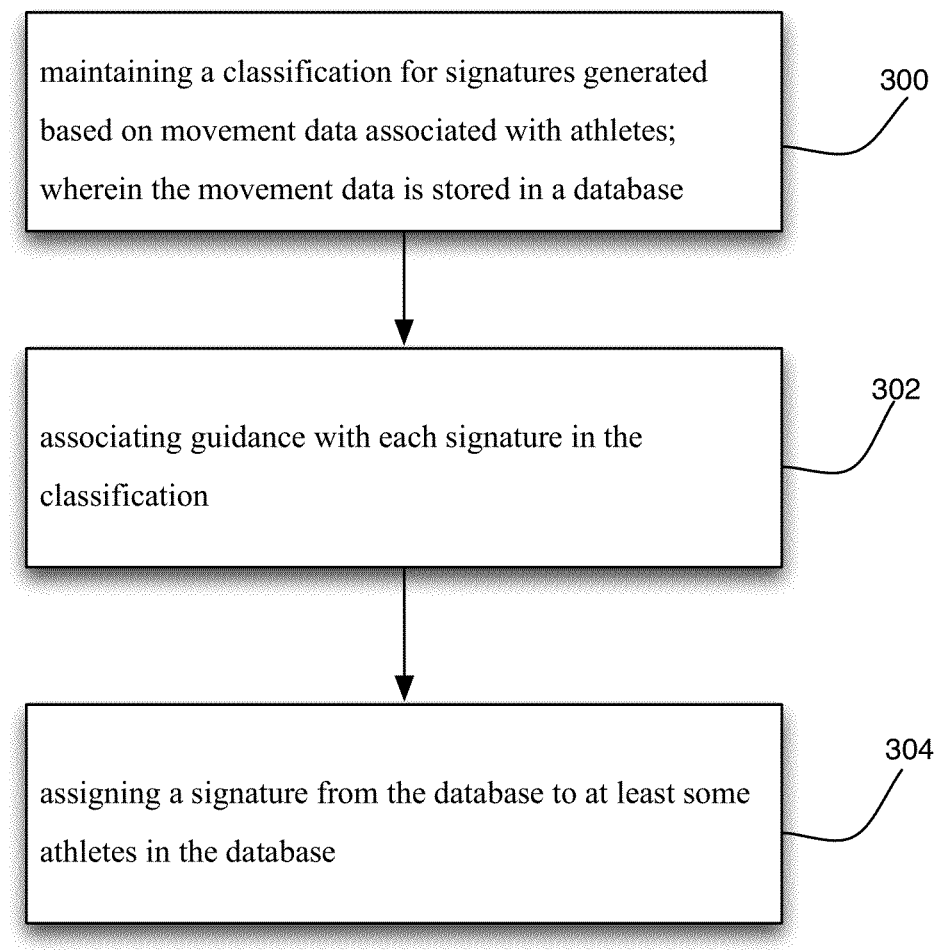
FIG. 3 shows a flowchart of a training method for athletes, in accordance with one embodiment of the invention.

The output sub-system 106 facilitates output of athletic signatures via printout, display, etc. FIG. 3 shows a flowchart corresponding to a method for generating a signature for an athlete, in accordance with one embodiment. The method includes the following processing blocks:

Block 300: in this block force-time data for a population of athletes is stored in memory. Said force-time data may be generated by a sensing sub-system 102 in respect of each of said plurality of athletes in response to the said athlete performing an athletic movement, and comprises values for a concentric net vertical impulse (CON-IMP), an average eccentric rate of force development (ECC-RFD), and an average vertical concentric force (CON-VF);

Block 302: in this block a normalization of the force-time data for each athlete based on values of the force-time data within the population of athletes is performed;

Block 304: in this block a profile comprising an athletic signature for each athlete in the population, wherein said profile comprises the normalized values for the concentric net vertical impulse (CON-IMP), the average eccentric rate of force development (ECC-RFD), and the average vertical concentric force (CON-VF) for the athlete.

In one embodiment, wherein performing the normalization comprises calculating a T-score for concentric net vertical impulse (CON-IMP), average eccentric rate of force development (ECC-RFD), and average vertical concentric force (CON-VF) for each athlete. Each T-score may be calculated as an average over a standard deviation.

In one embodiment, the population of athletes may comprise athletes who play a particular sport.

In one embodiment, the population of athletes may comprise athletes who play a particular position within a particular sport.

The method may further comprise analyzing the athletic signatures of elite athletes and characterizing said signatures into an archetypal signature corresponding to one of a role within a sport and a sport.

In one embodiment, the force-time data comprises repeating data collected for each athlete when performing the same athletic movement at different times.

Figure 4:
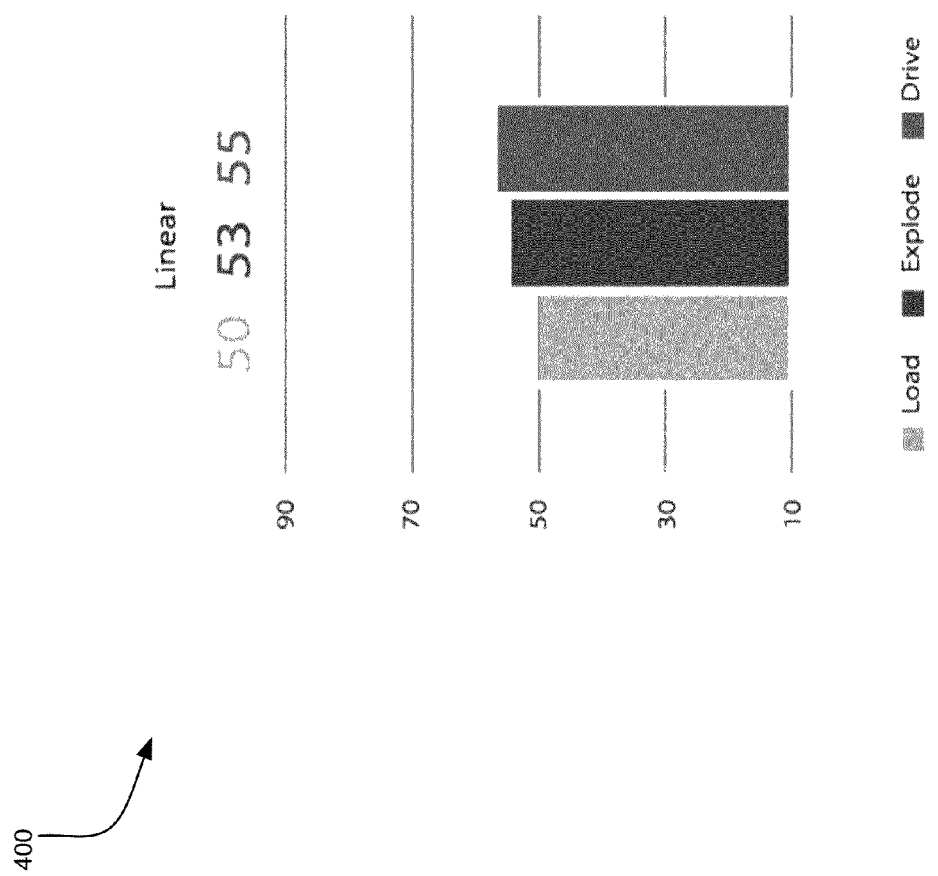

FIG. 4 shows a flowchart of a training method for training athletes, in accordance with one embodiment of the invention. The training method includes the following processing blocks:

Block 400: in this block a classification for signatures generated based on movement data associated with athletes is maintained;

Block 402: in this block guidance is associated with each signature in the classification;

Block 404: in this block a signature is assigned from the database to at least some athletes in the database.

In one embodiment, the classification comprises a linear signature to characterize athletes who excel at movement in a straight line. FIG. 4 shows a depiction of the linear signature in the form of a bar chart 400 to show the values for the variables load, explode, and drive, in accordance with one embodiment. For the linear signature, the load value is less than the others by 5, in one embodiment.

Figure 5:
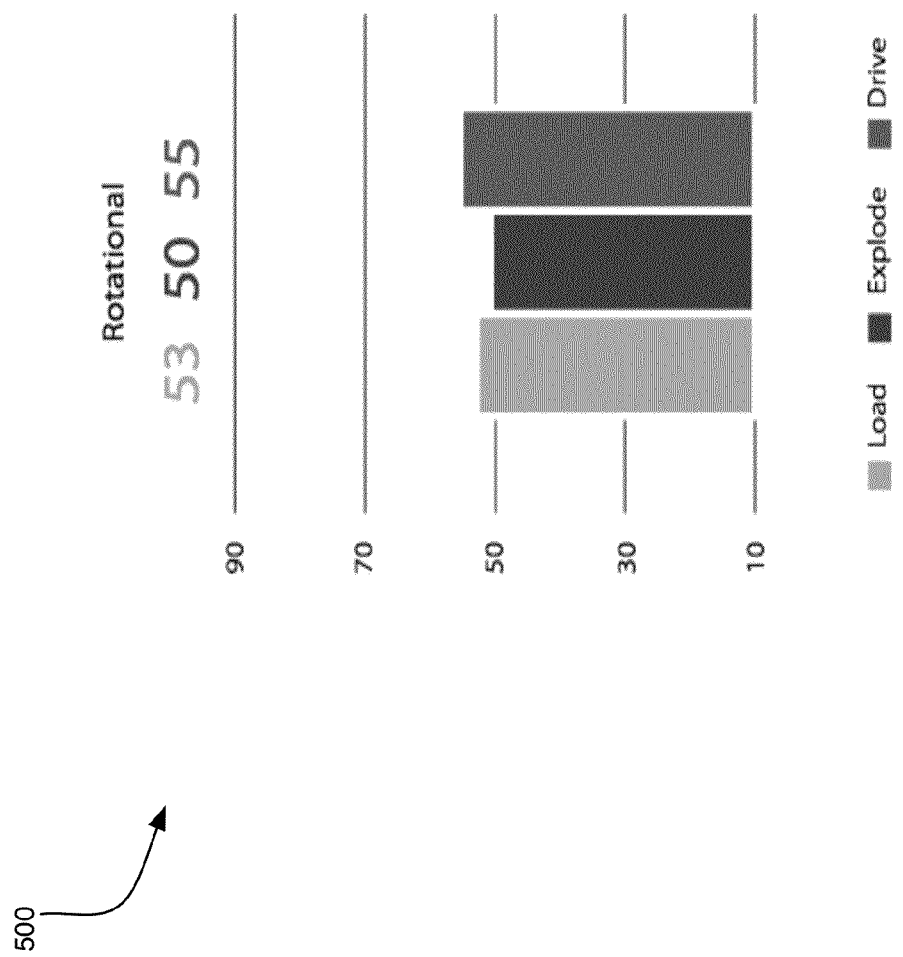

In one embodiment, the classification comprises a rotational signature to characterize athletes who excel at movement that includes an element of rotation. FIG. 5 shows the depiction of the rotational signature in the form of a bar chart 500, in accordance with one embodiment. For the rotational signature, the explode values is less than the others by 5, in one embodiment.

Figure 6:
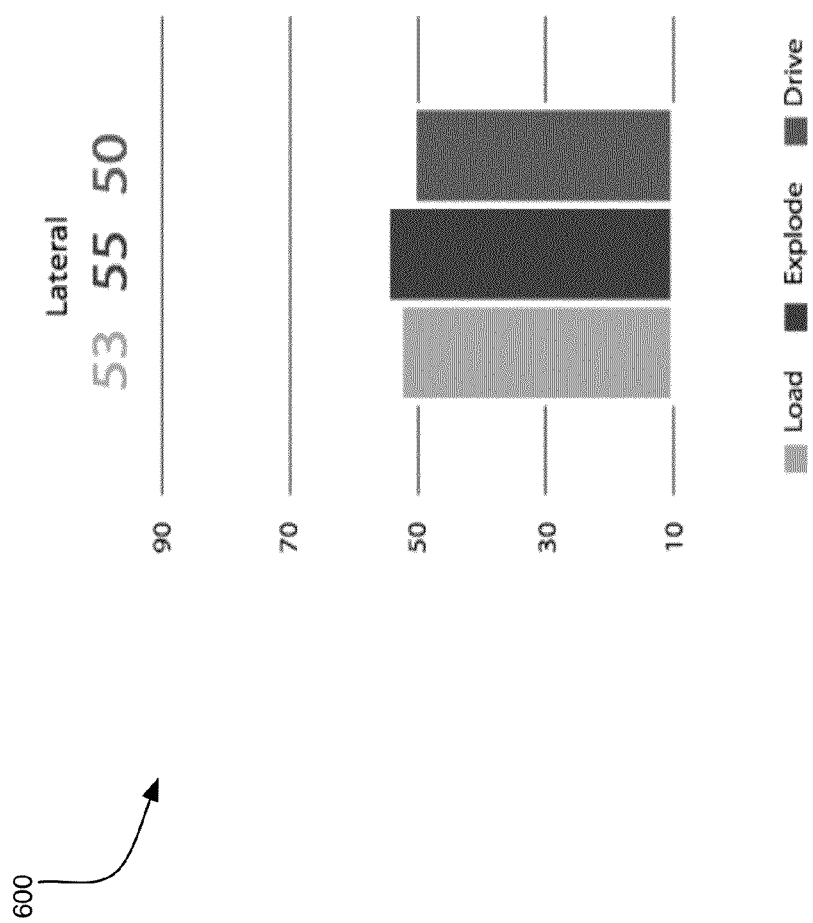

In one embodiment, the classification comprises a lateral signature to characterize athletes who excel at lateral movements. FIG. 6 shows a depiction of the rotational signature in the form of a bar chart 600, in accordance with one embodiment. For the lateral signature, the drive value is less than the others by 5, in one embodiment.

In one embodiment, the classification may include extreme signatures. These are signatures where one of the variables load, explode, drive are higher than the other two by a threshold amount.

Figure 7:
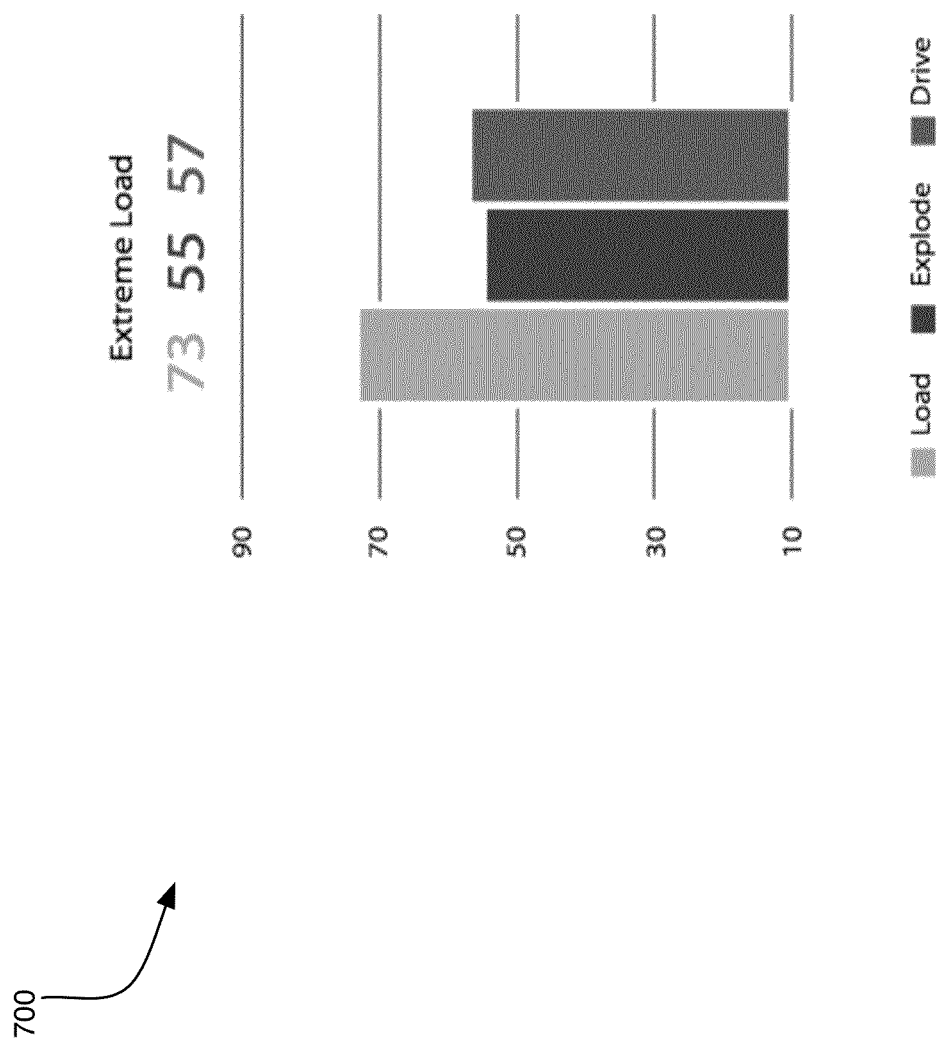

FIG. 7 shows a bar chart 700 corresponding to a signature classification called extreme load for which the load value exceeds the other values by 10.

Figure 8:
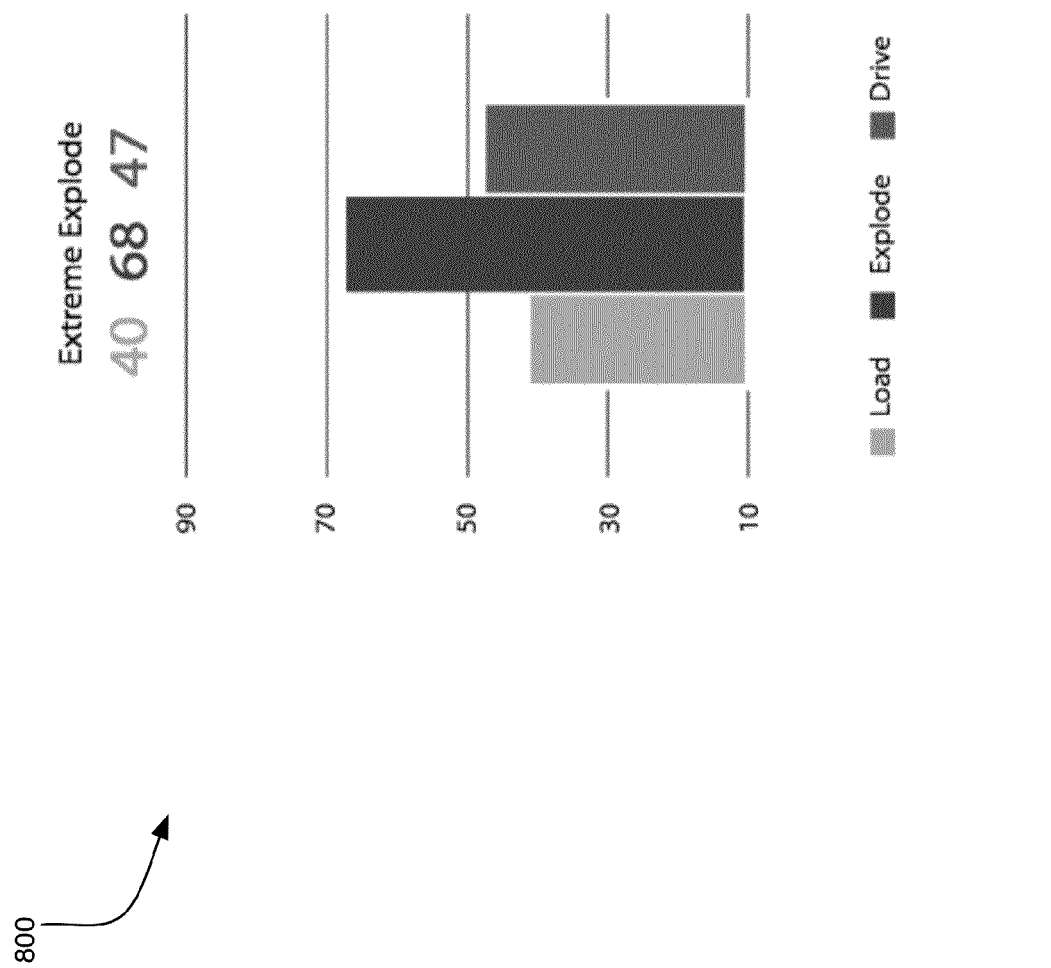

FIG. 8 shows a bar chart 800 corresponding to a signature classification called extreme explode for which the explode value exceeds the other values by 10.

Figure 9:
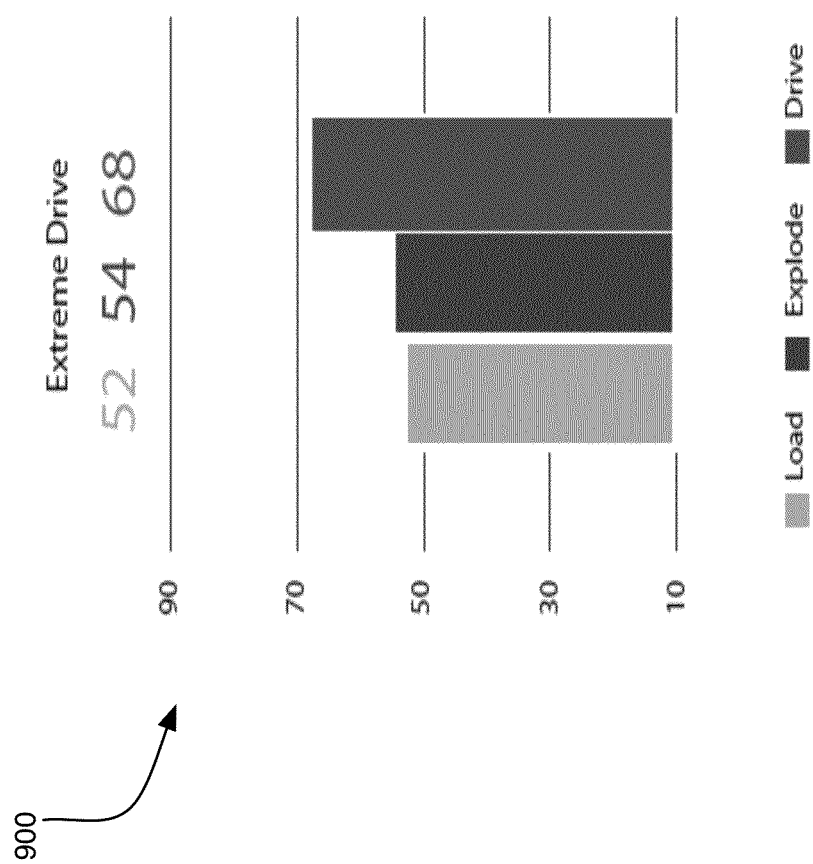

FIG. 9 shows a bar chart 900 corresponding to a signature classification called extreme load for which the load value exceeds the other values by 10.

In one embodiment, the classification may include weak signatures. These are signatures where one of the variables load, explode, drive is lower than the other two by a threshold amount.

Figure 10:
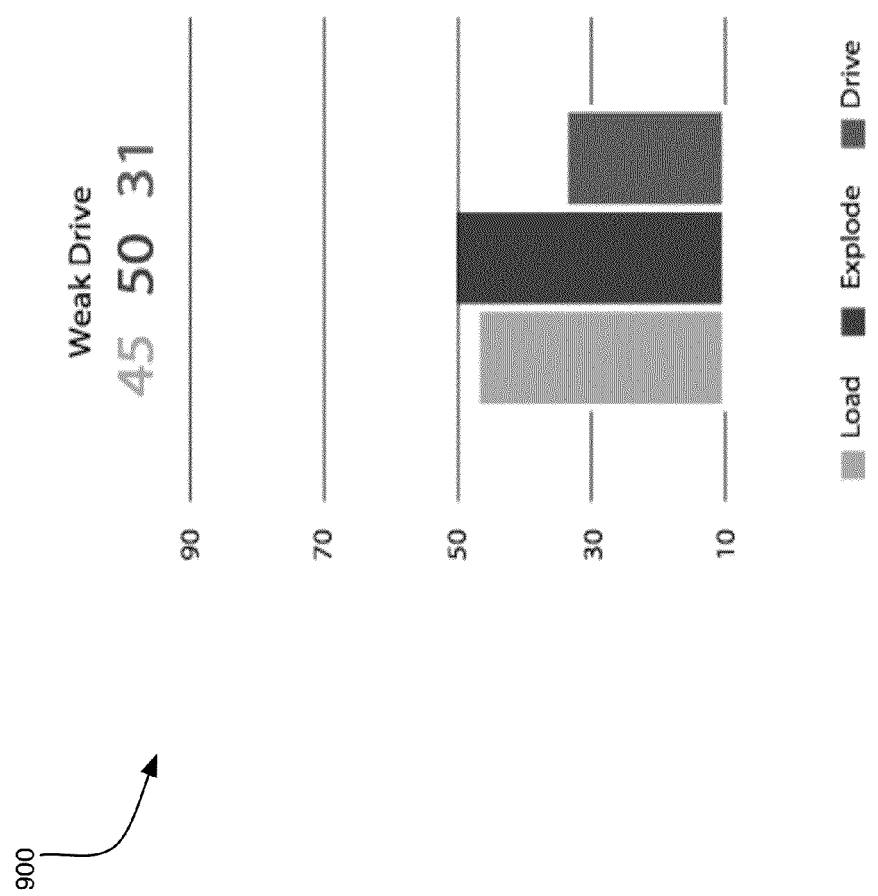

FIG. 10 shows a bar chart 1000 corresponding to a signature classification called weak drive for which the load value is less than the other values by 10.

Figure 11:
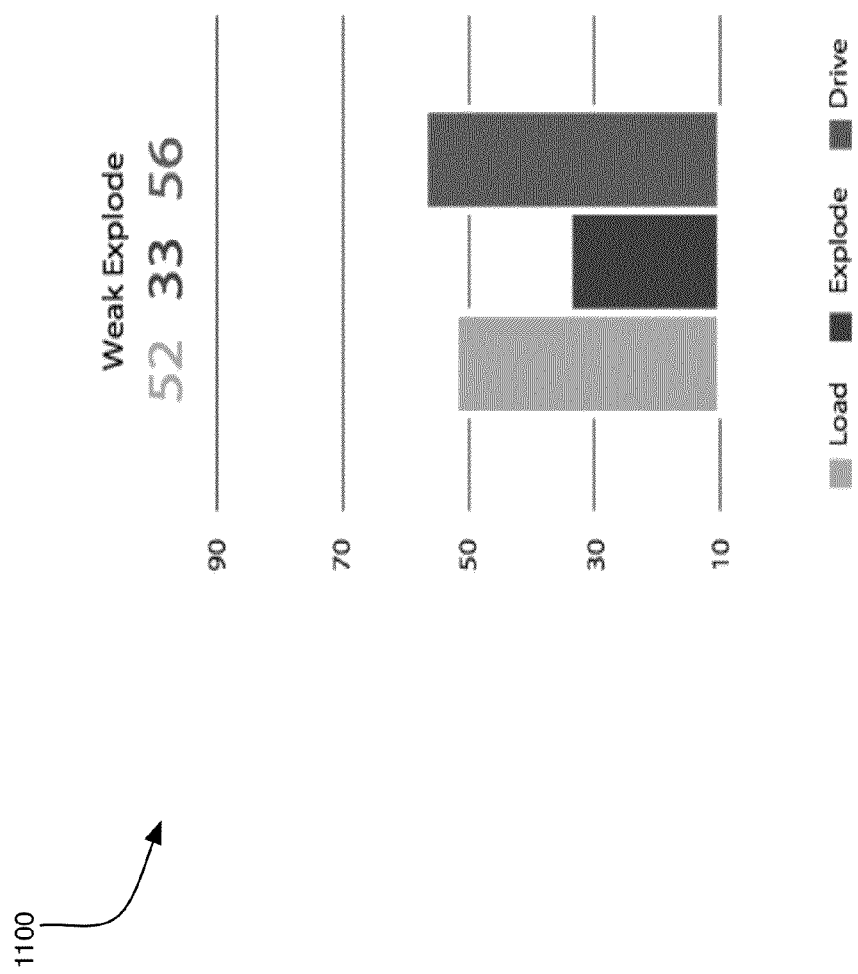

FIG. 11 shows a bar chart 1100 corresponding to a signature classification called weak explode for which the explode value is less than the other values by 10.

FIG. 12 shows a bar chart 1200 corresponding to a signature classification called weak load for which the load value is less than the other values by 10.

FIG. 13 shows a matrix 1300 indicative of the type of guidance that might be associated with the signatures in the classification, in accordance with one embodiment. As will be seen the matrix 1300 associates particular signatures with genetic/ethnic background, sport, position is sport, injury risk, and exercise needs.

In one embodiment, by determining signatures for athletes that are good at certain sports or certain positions within sports it is possible to determine certain archetypical signatures associated with performance excellence. Column E in the matrix 1300 indicates the archetypical signatures for certain sports, and sport positions.

In one embodiment, the guidance may comprise at least one exercise protocol for at least one of transforming an athlete's signature to a desired signature and preventing injury to the athlete. The exercise protocol may comprise an exercise definition, a number of repetitions associated with the exercise, a number of sets associated with the exercise, and a schedule for performing the exercise.

The output sub-system 106 facilitates output of athletic signatures via printout, display, etc.

Figure 14:
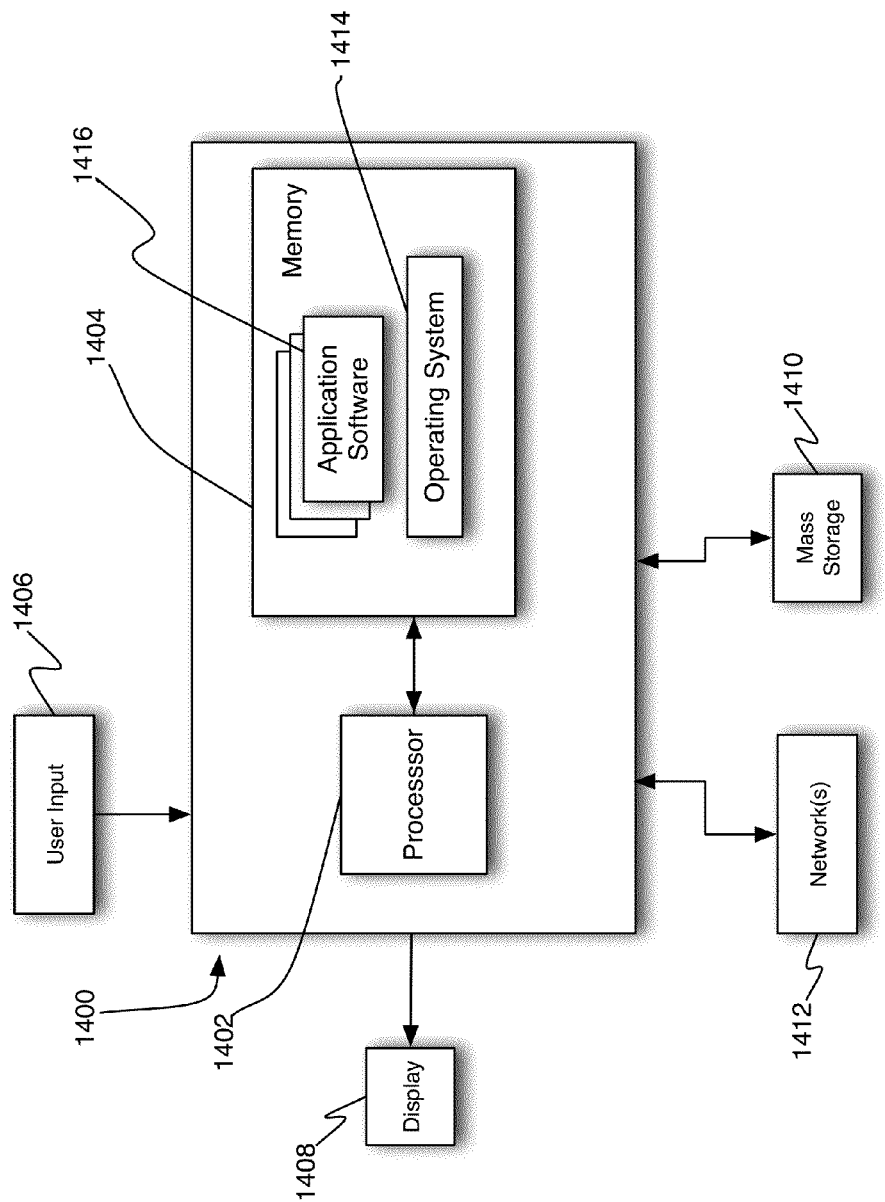
FIG. 14 shows a high-level block diagram of hardware used to implement the system of FIG. 1, in accordance with one embodiment of the invention.

FIG. 14 shows an example of hardware 1400 that may be used to implement portions of the system 1400, in accordance with one embodiment. The hardware 1400 may include at least one processor 1402 coupled to a memory 1404. The processor 1402 may represent one or more processors (e.g., microprocessors), and the memory 1404 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 1404 may be considered to include memory storage physically located elsewhere in the hardware, e.g. any cache memory in the processor 1402, as well as any storage capacity used as a virtual memory, e.g., as stored on a mass storage device.

The hardware also typically receives a number of inputs and outputs for communicating information externally. For interface with a user or operator, the hardware may include one or more user input/output devices 1406 (e.g., force-plate, keyboard, mouse, etc.) and a display 1408. For additional storage, the hardware 1400 may also include one or more mass storage devices 1410, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 1412 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 1412 and each of the components, as is well known in the art.

The hardware 1400 operates under the control of an operating system 1414, and executes application software 1416 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A computer-implemented method for training athletes, comprising:
    maintaining by a computer a classification for signatures generated based on movement data associated with athletes; wherein the movement data is stored in a database, and comprises kinematic data including normalized values for concentric net vertical impulse (CON-IMP), average eccentric rate of force development (ECC-RFD), and average vertical concentric force (CON-VF) for each athlete;
    associating by said computer guidance with each signature in the classification; and
    assigning by said computer a signature from the database to at least some athletes in the database.

2. The method of claim 1, wherein the classification comprises a linear signature to characterize athletes who excel at movement in a straight line.

3. The method of claim 1, wherein the classification comprises a rotational signature to characterize athletes who excel at movement that involves an element of rotation.

4. The method of claim 1, wherein the classification comprises a lateral signature to characterize athletes who excel at lateral movement.

5. The method of claim 1, wherein the classification comprises archetypical signatures associated with performance excellence.

6. The method of claim 5, wherein the performance excellence is characterized by one of a particular sport and a position within a particular sport.

7. The method of claim 1, further comprising generating the kinematic data by having an athlete perform a vertical jump from a force place from a standing position.

8. The method of claim 1, wherein the guidance comprises an indication of a propensity for a particular injury.

9. The method of claim 1, wherein the guidance comprises at least one exercise protocol for at least one of transforming an athlete's signature to a desired signature and preventing injury to the athlete.

10. The method of claim 8, wherein the exercise protocol comprises an exercise definition, a number of repetitions associated with the exercise, a number of sets associated with the exercise, and a schedule for performing the exercise.

11. A non-transitory computer-readable medium comprising instructions which when executed by a processing system causes said system to perform a method for training athletes, comprising:
    maintaining a classification for signatures generated based on movement data associated with athletes; wherein the movement data is stored in a database, and comprises kinematic data including normalized values for concentric net vertical impulse (CON-IMP), average eccentric rate of force development (ECC-RFD), and average vertical concentric force (CON-VF) for each athlete;
    associating guidance with each signature in the classification; and
    assigning a signature from the database to at least some athletes in the database.

12. The computer-readable medium of claim 11, wherein the classification comprises a linear signature to characterize athletes who excel at movement in a straight line.

13. The computer-readable medium of claim 12, wherein the classification comprises a rotational signature to characterize athletes who excel at movement that involves an element of rotation.

14. The computer-readable medium of claim 11, wherein the classification comprises a lateral signature to characterize athletes who excel at lateral movement.

15. The computer-readable medium of claim 11, wherein the classification comprises archetypical signatures associated with performance excellence.

16. A system, comprising:
    a processor; and
    a memory coupled to the processor, the memory storing instructions which when executed by the processor, causes the system to perform for training athletes, comprising:
    maintaining a classification for signatures generated based on movement data associated with athletes; wherein the movement data is stored in a database, and comprises kinematic data including normalized values for concentric net vertical impulse (CON-IMP), average eccentric rate of force development (ECC-RFD), and average vertical concentric force (CON-VF) for each athlete;

associating guidance with each signature in the classification; and assigning a signature from the database to at least some athletes in the database.

17. The system of claim 16, wherein the classification comprises a linear signature to characterize athletes who excel at movement in a straight line.

18. The system of claim 16, wherein the classification comprises a rotational signature to characterize athletes who excel at movement that involves an element of rotation.

* * * * *